J. W. MOSELY.
ATTACHMENT FOR MOWERS.
APPLICATION FILED JUNE 13, 1914.
1,135,463.
Patented Apr. 13, 1915.
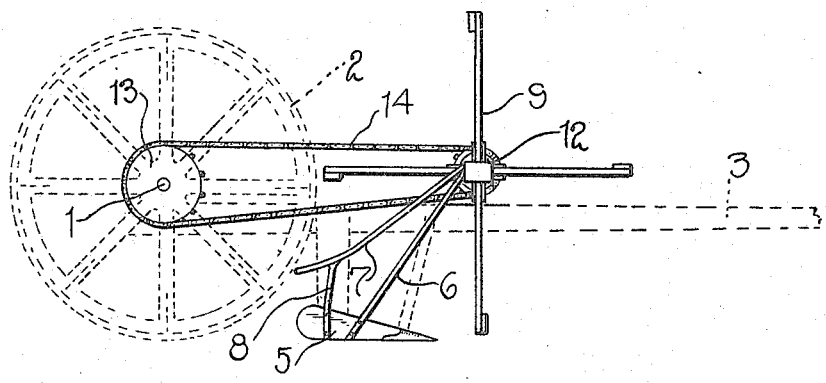
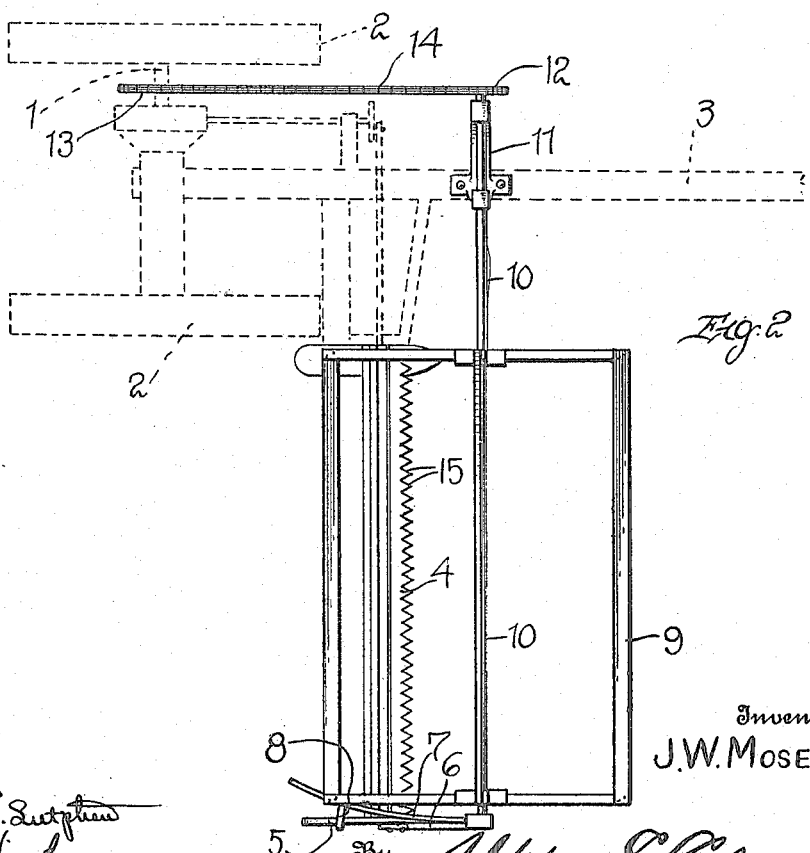
Inventor
J. W. MOSELY

UNITED STATES PATENT OFFICE.

JIMMIE W. MOSELY, OF AUSTIN, TEXAS.

ATTACHMENT FOR MOWERS.

1,135,463.     Specification of Letters Patent.     Patented Apr. 13, 1915.

Application filed June 13, 1914. Serial No. 844,961.

*To all whom it may concern:*

Be it known that I, JIMMIE W. MOSELY, a citizen of the United States, residing at Austin, in the county of Travis and State of Texas, have invented certain new and useful Improvements in Attachments for Mowers, of which the following is a specification, reference being had to the accompanying drawings.

This invention relates to attachments for mowers, and particularly to a dividing and feeding attachment for guiding the grain to the cutters of the mower in an upright position.

An object of this invention is the provision of an attachment which comprises an angular rod mounted at one end upon the shoe of the cutter bar of the mower, the rod extending forwardly and outwardly to a point forwardly of the cutter bar, and thence being inclined rearwardly and inwardly to guide the grain within the swath to the cutters.

A further object of this invention is the provision of an attachment for mowers which includes a reel mounted upon an axle, the axle being supported at one end in a bracket carried by the draft tongue of the mower and being mounted at its opposite end in the forward end of the divider bar, the blades of the reel being adapted to sweep the grain in a standing position to the cutter teeth, and the reel being operatively connected to the axle of the mower so that the reel is rotated upon movement of the mower over the ground.

With these and other objects in view, my invention consists in the novel construction, combination, and arrangement of parts to be hereinafter more fully described, claimed, and illustrated in the accompanying drawing, in which, Figure 1 is a side elevational view of my improved attachment, showing the same applied for use; and Fig. 2 is a top plan view thereof.

Referring more particularly to the drawing, the numeral 1 designates the axle of an ordinary mower, upon the opposite ends of which the wheels 2 are mounted, the mower including a forwardly extending draft tongue 3 and the outwardly projecting cutter bar 4 upon the outer end of which the sliding foot 5 is carried.

My improved attachment consists of a divider bar 6 which is connected at one end to the foot 5 rearwardly of the cutter bar, the divider bar being directed forwardly and outwardly of the foot to extend forwardly and to one side of the cutter bar, the bar 6 being bent intermediate of its ends and being inclined rearwardly and inwardly as at 7, the inner end of the rearwardly extending portion 7 terminating rearwardly of the cutter bar 4 and being braced by a suitable upstanding arm 8 which extends from the foot 5. The attachment also includes a reel 9 which is mounted on a shaft 10 forwardly of the cutter bar 4, one end of the shaft being rotatably mounted in the divider bar at its forward end, the other end of the bar being rotatably mounted in a bracket 11 which projects upwardly from the tongue 3, in transverse alinement with the forward end of the divider bar 6. Keyed to the shaft 10 is a pinion 12 and a gear wheel 13 is also keyed to the axle 1 of the mower, the gear wheel 13 and the pinion 12 being operatively connected by a sprocket chain 14, so that upon movement of the mower, the reel 9 is rotated.

In the practical use of my improved mower, the same is drawn over the surface of the ground in the usual manner, the cutter teeth being operated by the usual mechanism, and it will be seen that as the mower is moved over the ground, the divider bar 6 divides the grain so that the portion thereof within the swath is prevented from falling outwardly of the foot into the path of the cutter as the mower is moved to cut another row. As the reel extends closely adjacent to the bar 6, the grain, after it is cut, is raised by one of the blades of the reel and forced against the rearwardly extending inturned bar 7, so that all of the grain which is cut is thrown directly behind the cutter bar so as to be out of the way of the mower on its next run down the field. It will be understood that when the wind is blowing in the direction of travel of the mower, the grain is frequently blown flat against the ground so that the cutter bar moves over some of the grain without cutting the same. By the provision of the reel 9, in connection with the divider, the grain is straightened to a standing position the entire length of the cutter by the revolving blades of the reel, so that all of the grain is cut closely adjacent to the ground.

Having thus fully described my inven- tion, what I desire to claim and secure by Letters Patent, is:—

In combination with a mower including a cutter bar and a foot connected to the outer end of the cutter bar, of a divider bar connected at one end to the foot, said divider bar being extended upwardly and forwardly of the foot to extend to a point above the cutter bar in advance of the same, said divider bar being then directed rearwardly and inwardly and terminating rearwardly of the cutter bar and inwardly of its outer end, and the divider bar at the juncture of its forwardly and rearwardly extending portions being formed with a shaft bearing.

In testimony whereof I hereunto affix my signature in the presence of two witnesses.

JIMMIE W. MOSELY.

Witnesses:
C. O. GAGE,
J. A. HOLLOWAY, Jr.

Copies of this patent may be obtained for five cents each, by addressing the "Commissioner of Patents, Washington, D. C."